US010015651B1

(12) United States Patent
Chauhan

(10) Patent No.: US 10,015,651 B1
(45) Date of Patent: Jul. 3, 2018

(54) DEVICE SWITCHING SERVICE

(71) Applicant: T-Mobile, U.S.A., Inc., Bellevue, WA (US)

(72) Inventor: Kanakrai Chauhan, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/396,065

(22) Filed: Dec. 30, 2016

(51) Int. Cl.
| | |
|---|---|
| *H04M 3/00* | (2006.01) |
| *H04W 4/50* | (2018.01) |
| *H04W 4/00* | (2018.01) |
| *H04W 8/20* | (2009.01) |
| *H04W 8/24* | (2009.01) |
| *H04L 29/08* | (2006.01) |
| *G06Q 30/06* | (2012.01) |
| *G06Q 10/08* | (2012.01) |

(52) U.S. Cl.
CPC ............ *H04W 4/50* (2018.02); *G06Q 10/083* (2013.01); *G06Q 30/0633* (2013.01); *H04L 67/146* (2013.01); *H04W 4/001* (2013.01); *H04W 8/205* (2013.01); *H04W 8/24* (2013.01)

(58) Field of Classification Search
CPC . H03W 4/001; G06Q 30/0633; G06Q 10/083; H04L 67/146; H04W 8/205; H04W 8/24
USPC ........................................................ 455/418
See application file for complete search history.

(56) References Cited

U.S. PATENT DOCUMENTS

| | | | | |
|---|---|---|---|---|
| 9,619,180 | B2* | 4/2017 | Malkin | ................ G06F 3/0685 |
| 9,753,864 | B2* | 9/2017 | Ekberg | ............... G06F 12/1408 |
| 2009/0241040 | A1* | 9/2009 | Mattila | ................. G06F 3/0481 |
| | | | | 715/760 |
| 2011/0178863 | A1* | 7/2011 | Daigle | ............... G06Q 30/0231 |
| | | | | 705/14.31 |
| 2011/0225417 | A1* | 9/2011 | Maharajh | ................ G06F 21/10 |
| | | | | 713/150 |
| 2012/0203648 | A1* | 8/2012 | Rothschild | ............. G06Q 30/06 |
| | | | | 705/26.1 |
| 2013/0148805 | A1* | 6/2013 | Ekberg | .................... H04L 9/065 |
| | | | | 380/255 |
| 2013/0173754 | A1* | 7/2013 | van Os | .................... H04L 67/02 |
| | | | | 709/219 |
| 2014/0051418 | A1* | 2/2014 | van Os | ................. H04W 4/001 |
| | | | | 455/418 |
| 2014/0115346 | A1* | 4/2014 | Ekberg | .................... G06F 21/10 |
| | | | | 713/193 |
| 2015/0019280 | A1* | 1/2015 | Mejegard | ............... G06Q 10/06 |
| | | | | 705/7.23 |
| 2015/0046557 | A1* | 2/2015 | Rosenberg | ............ H04W 12/08 |
| | | | | 709/213 |

(Continued)

*Primary Examiner* — Marceau Milord
(74) *Attorney, Agent, or Firm* — Han Santos, PLLC

(57) ABSTRACT

A device switching technique that can be used when a user switches from a first cell phone to a second cell phone is described, wherein a phone provider detects an event indicating that a device switch is imminent and sets up temporary storage associated with a first device. At the user's convenience, the user performs a data transfer process to transfer a portion of user data from the first device to the temporary storage. When the user receives the second device, such as in a phone store, remaining user data is transferred from the first device to the second device, thereby decreasing the amount of time necessary to set up the second device.

20 Claims, 6 Drawing Sheets

(56) References Cited

U.S. PATENT DOCUMENTS

2015/0199529 A1* 7/2015 Rosenberg ............ G06F 21/606
726/26

* cited by examiner

DEVICE SWITCHING SERVICE

BACKGROUND

Ownership of personal electronic devices, such as cellular telephones, has become more common, and people from pre-teenagers to senior citizens rely more heavily than ever on using their devices in their daily lives. It is common for cellular telephone users to upgrade to a new telephone after one to three years of use. But the process of switching from one device to another is tedious and time consuming, and typically requires up to an hour of a user's time to transfer data from the user's old telephone to a new telephone. Such a process is also wrought with security issues that put a user's personal information and content at risk

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
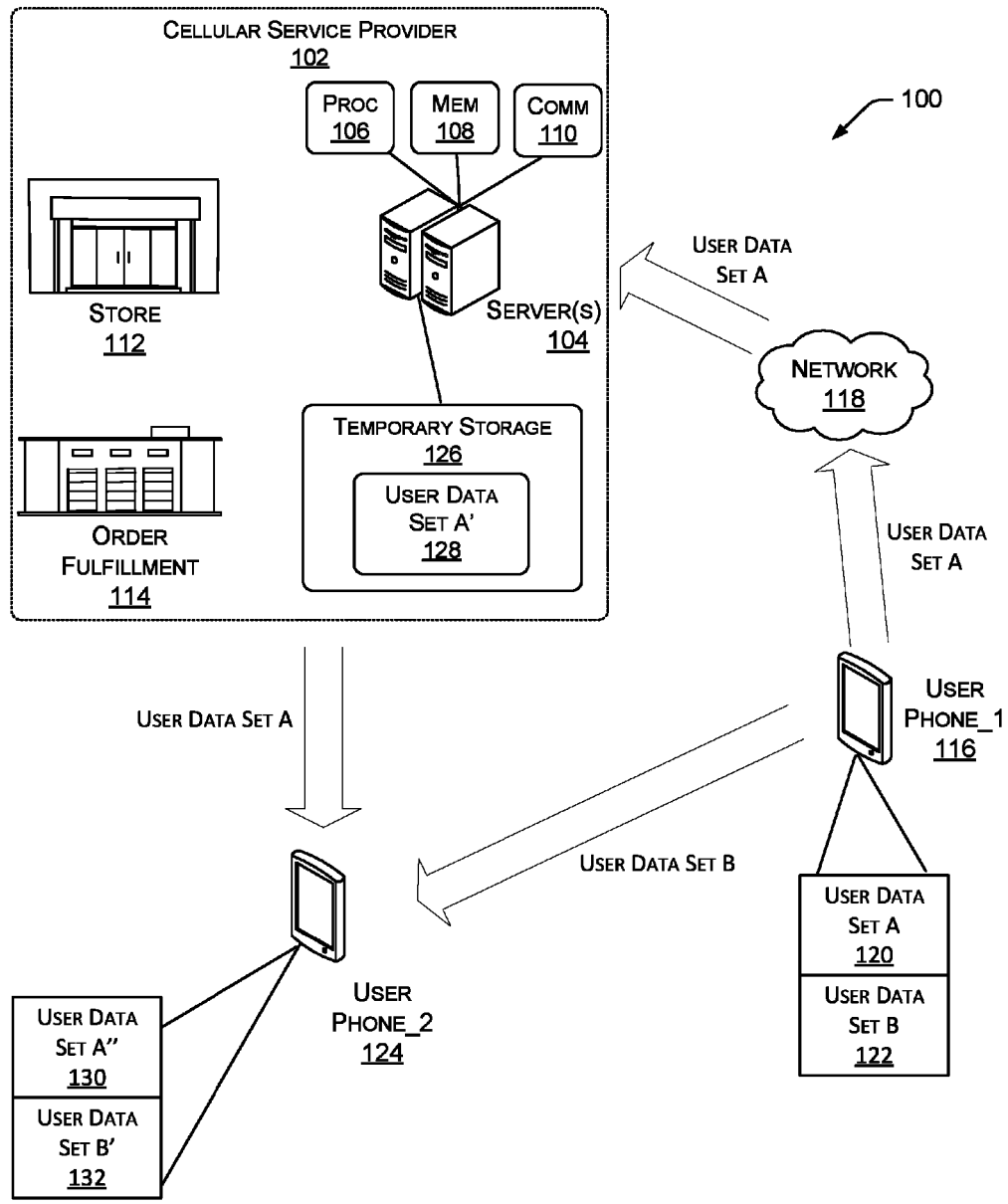
FIG. 1 illustrates an example architecture for implementing the device switching technology described herein.

This disclosure is directed to device switching techniques for use when a user of an electronic device storing personal data switches to a new electronic device, and wherein the personal data will be transferred to the new electronic device. For example, a user typically stores many types of personal data files on the user's cell phone, such as contacts, messages, photos, videos, documents, music, and the like. For discussion purposes, the following discussion of the techniques and implementations will continue to make specific reference to cellular telephones. However, it is noted that the techniques may be applied to any electronic device capable of storing personal data of a user.

There are several scenarios that involve a cellular telephone user being provided a replacement phone from a cellular service provider. The most common scenario is when the user upgrades from an older phone to a new phone. This is typically done in person at a retail location, or it can be done via a mailing service, such as the United States Postal Service, Federal Express, UPS, or the like.

Another scenario which requires the provision of a new phone to a customer is when the customer's phone experiences a technical problem that requires repair, either under warranty or otherwise. In such a situation, a service provider typically provides a replacement phone to the user in person or by mail.

Another scenario is when the service provider needs to perform a factory reset on a user's phone to repair a technical problem and data stored on the phone by the user will be lost in the process. There are many instances in which a customer (i.e. a phone owner or user), when experiencing functional issues, contacts the cellular service provider 102 to resolve the issues, either in person or remotely. In a significant number of these instances, the issues are unable to be resolved and a reset of the phone is indicated. But when this is done, user data will often be lost. The techniques provided herein allow for backup of such user data before the reset is performed. After the reset has completed, the backed up user data can be restored to the same phone.

In each of these scenarios, the user must go through a process to transfer personal data from the user's current phone to the user's new phone. This is done either by a user application or by a service provider agent, and the process typically takes from forty-five (45) minutes to one (1) hour. It typically takes approximately fifteen (15) minutes just to prepare to start the data backup. This is, at best, inconvenient for a user. Accomplishing the data transfer more efficiently would require fewer device resources (the old phone, the new phone, a connecting network, etc.) and would save time for the user and for service provider agents.

In addition to the excessive time that it takes to effectuate such a data transfer, current processes have other significant security issues. Some providers may require access to a user's personal cloud storage. But accessing cloud storage utilized by a user can provide access to data that the user does not want the service provider to access. Such an arrangement also introduces possible liability issues for the service provider. In addition, several cloud services do not back up all user data to one location, thus, the user data is fragmented, which can be a problem in the backup/restore process. Furthermore, all user data files associated with a phone are not typically backed up to cloud storage and may be missed in the data transfer process.

Generally, the technology described herein relates to a cellular phone service provider setting up temporary cloud storage when a phone replacement event occurs. Once the temporary cloud storage is set up, the service provider affords a way for the user to access the temporary cloud storage and start backing up personal data at the user's convenience. The majority of user data is backed up to the cloud storage when the user does not need to use the phone for other things.

To ensure privacy and security, one or more implementations do not allow the service provider to access the contents of the temporary cloud storage notwithstanding the fact that the service provider allocated and set up the temporary cloud storage. Also, or in the alternative, one or more implementations provide that the service provider that set up the temporary cloud storage will also permanently delete the temporary cloud storage once the personal data is confirmed to be on the new phone.

When the user receives a new phone, either by mail delivery or in person in a retail outlet, the user performs a download that transfers the personal data from the temporary cloud storage to the new phone. This process, like the initial backup from the original phone, is performed at the user's convenience at a time when the user can start the backup and take care of other tasks. After the backup is complete, a copy of a significant portion of personal data from the original phone is stored in the new phone. But some data is still stored on the original phone. It is desirable that such data be transferred to the new phone.

When ready, the user or a service provider agent initiates a phone to phone transfer that adds transfers user data that was not backed up to the temporary cloud storage to the new phone. After this occurs, all of the transferrable user data is located on the new phone, which is activated by the service provider and is ready for use. The time for the actual phone to phone transfer is reduced by as much as seventy-five (75) or eighty (80) percent of the time taken by a current transfer using known processes.

Further details of one or more implementations of these techniques are described in greater detail, below, with respect to the accompanying figures.

Example Network Architecture

FIG. 1 illustrates an example architecture 100 for implementing the device switching technology described herein. Although specific devices are shown and described for the present techniques, it is noted that functionality is generally hosted on one or more computing devices. Examples of such computing devices include without limitation, servers, personal computers, laptops, embedded devices, tablet computers, smart phones, and virtual machines. In many cases, computing devices are to be networked.

The architecture 100 includes a cellular service provider system 102 that includes one or more servers 104. The server 104 is any computing device that may participate in a network. Such a network may be, without limitation, a local area network ("LAN"), a virtual private network ("VPN"), a cellular network, or the Internet. The servers 104 include at least a processor 106, a general memory 108, and a communication module 110. The processor is capable of executing program instructions, and can be a central processing unit, a repurposed graphical processing unit, and/or a dedicated controller such as a microcontroller.

Memory 108 is any computer-readable media which may store several software components, such as an operating system and/or other applications. In general, a software component is a set of processor executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The communications module 110 includes hardware and/or software components that are configured to allow the server(s) 104 to communicate with other electronic devices. The communications module 110 includes at least an input/output (I/O) interface or a network interface, or it can include both. An I/O interface can be any controller card, such as a universal asynchronous receiver/transmitter (UART) used in conjunction with a standard I/O interface protocol such as RS-232 and/or Universal Serial Bus (USB). A network interface can be any network interface device, such as a network interface card that supports Ethernet, Wi-Fi, or any other physical and/or datalink protocols. Such a network interface may potentially work in concert with an I/O interface.

The example architecture 100 also includes a retail store 112, and an order fulfillment center 114. In contact with the cellular service provider system 102 is a user phone, identified as user phone_1 116. User phone_1 116 communicates with the servers 104 via network 118, which can be any type of communication network suitable for the present purposes, such as the Internet, a cellular phone/data network ((GSM Evolution (EDGE), Wideband Code Division Multiple Access (W-CDMA), HSPA, LTE, LTE-Advanced, CDMA-2000 (Code Division Multiple Access 2000, etc.)), a local or wide area network, or the like.

User phone_1 116 stores personal data associated with the user. In the present example, the personal data includes user data set A 120 and user data set B 122. The personal data includes, but is not limited to, contact records, instant messages (Short Messaging Service (SMS), Multimedia Messaging Service (MMS), etc.), photo files (JPEG, GIF, TIFF, PNG, Exif, BMP, etc.), video files (MPEG, MP4, WMV, AVI, etc.), electronic documents (.doc, pdf, html, .docx, ASCII, .wpd, etc.), audio files (WAV, WMA, MP3, AIFF, etc.), and the like.

User data set A 120 is transmitted to the servers 104 via the network 118, and it is stored in temporary storage memory 124 as user data set A' 128. User data set A' 128 is eventually transmitted to the user's new phone user phone_2 124—where it is stored (user data set A" 130). This transfer may occur over any network, wired or wireless, that is suitable for the purposes described herein.

Via the connection through the network 118 or through a different connection, user data set B 122 is transmitted to user phone_2 128, where it is stored (user data set B' 132). Thus, the user's new phone (user phone_2 128) stores the same data that was stored on the user's original phone (user phone_1 116). Because the data is transferred in two parts, and one part was transferred prior to a phone-to-phone direct transfer, the data transfer is more efficient than transferring all of the data at one time via a phone-to-phone direct transfer.

After user data set A 120 and user data set B 122 are transferred to user phone_2 128, the cellular service provider 102 deletes the temporary storage 124 from the servers 104, thus permanently deleting any user data (user data set A' 126) stored with the cellular service provider 102.

It is noted that in one or more implementations of the described techniques, contents of the temporary storage— i.e. user data set A' 126—is not accessible by the cellular service provider 102. In such cases, the cellular service provider 102 merely establishes the temporary storage 126 and provides access to store and transmit user data set A' 126, and deletes the temporary storage 126 after user data is transferred from user phone_1 116 to user phone_2 128. In this way, the user data is not accessible by parties not under a user's control.

It is also noted that in the "reset" scenario described above, the same process is performed, but the backed up data (user data set A 126) is restored to the same phone (user phone_1 116) from where it originated. For reference purposes in this case, user phone_2 128 is actually user phone_1 116 as depicted in the drawings. In other words, only one phone is used in the described processes.

The previous description related to FIG. 1 is meant to described the general process and technique disclosed herein. These and other steps and/or implementations will be discussed in greater detail, below, with reference to subsequent figures.

Example Architecture—Initial Steps of Device Switching Technology

Figure 2:
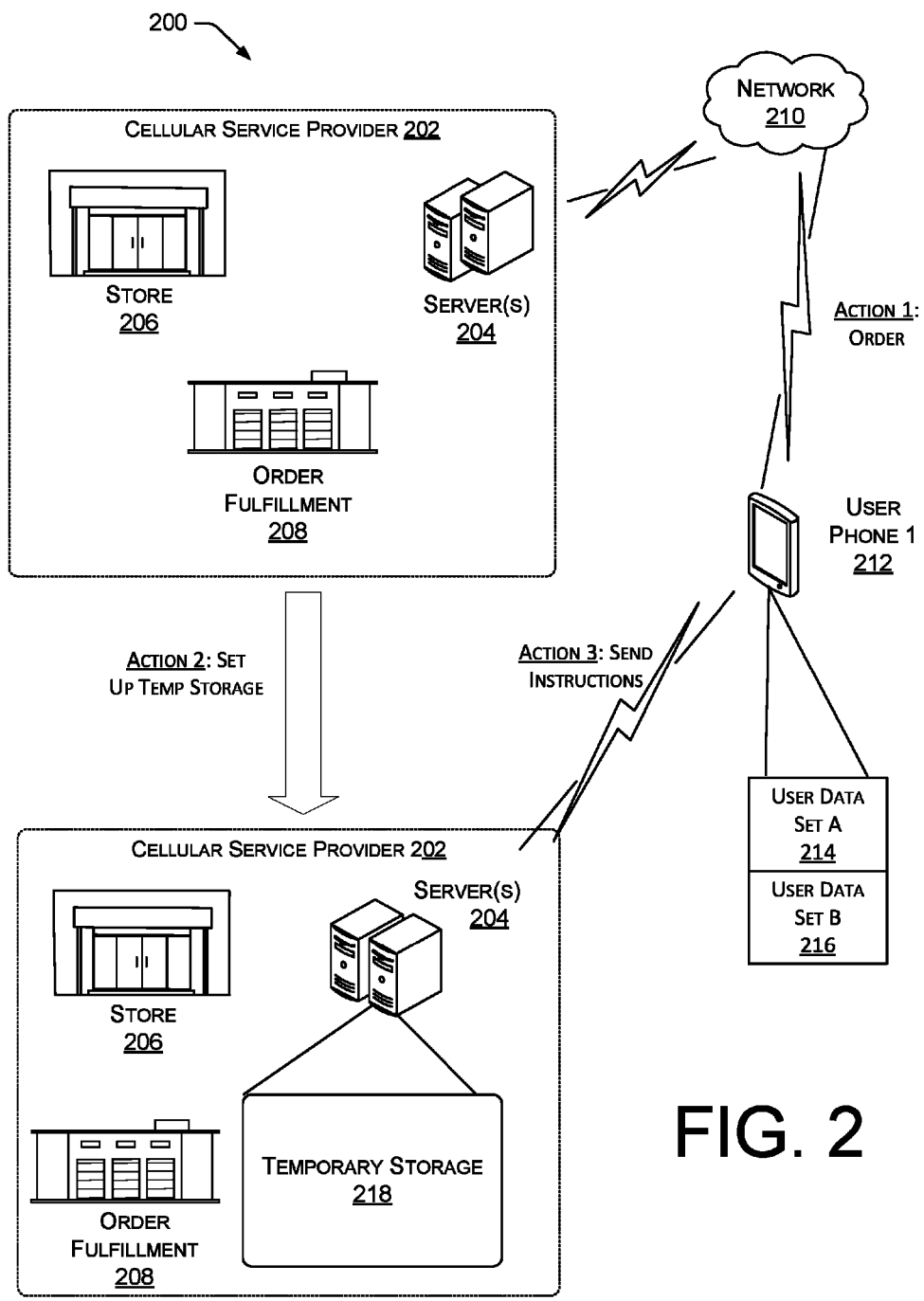
FIG. 2 is a diagram of an example architecture for implementing the initial steps of the device switching technology described herein.

FIG. 2 is a diagram of an example architecture 200 for implementing the initial steps of the device switching technology described herein. The example architecture 200 is meant to depict early states of one or more entities involved in the device switching process, and to supplement the description of the process in FIG. 1. More details of the device switching process are described below, with respect to FIGS. 3-5. A detailed implementation of a full process is described with respect to FIG. 6, below.

FIG. 2 depicts a cellular service provider system 202 that includes one or more servers 204, a retail store 206, and an order fulfillment center 208. For purposes of the present discussion, the order fulfillment center 208 includes a role as a call center and as a warehouse. The call center includes agents that handle customer service issues remotely, and the warehouse handles shipping and receiving of products to and from customers. Also for convenience and efficiency, this discussion refers to agents of the cellular service provider 202 as taking action from the retail store 206 or the order fulfillment center 208. Typically, agents situated in the retail store 206 deal with customers face to face, while agents at the order fulfillment center 208 deal with customers by telephone or the Internet.

The actual location of an agent and means of communication with a customer are not integral to the techniques described herein. In other words, if the present description states that an agent receives an order from a customer, it can mean that the agent is in the store and receives an order from a customer in person, by phone, by Internet, or any other method, or that the agent is in the order fulfillment center and receives an order from the customer by any known method of communication. Although discussion may not describe a particular agent location or means of communication, it is intended that any of the situations described above can apply.

The servers 204 are communicatively connected to a network 210 that is accessible by provider agents as well as by people who are not a part of the provider entity. In this example, user phone_1 212 establishes a connection with the servers 204 over the network 210, which can be the Internet, a cellular telephone network, a local or wide area network, or any other type of network suitable to handle the tasks described herein. User phone_1 212 stores user data set A 214 and user data set B 216.

As indicated by "Action 1: Order," a replacement phone for user phone_1 212 is ordered. This order is shown being initiated by an owner of user phone_1, for example, when the user orders an upgrade of his telephone. However, the order can be initiated by an agent of the cellular provider. This might be the case when the user has a functionality issue with the phone and the cellular provider agent decides to replace the phone under a warranty agreement. In either case, an order to replace user phone_1 212 is initiated.

Upon detection that a new phone has been ordered, and assuming that a user will be needing to transfer data from an existing phone to a new phone, the cellular service provider 202 establishes temporary storage 218 dedicated to user phone_1 212 (indicated by "Action 2: Set Up Temp Storage"). This action provides a temporary cloud storage space where the user can transfer at least a portion of the personal data from user phone_1 212.

Approximately contemporaneously with setting up the temporary storage, the cellular service provider 202 sends a link to user phone_1 212 whereby the user can initiate a data transfer procedure to upload at least a portion of the user data to the temporary storage (indicated by "Action 3: Send Link"). Although shown and described as sending a link to begin the process, other methods may be used to accomplish this task. For example, a message may be sent informing the user to execute an application to start the data transfer.

Figure 3:
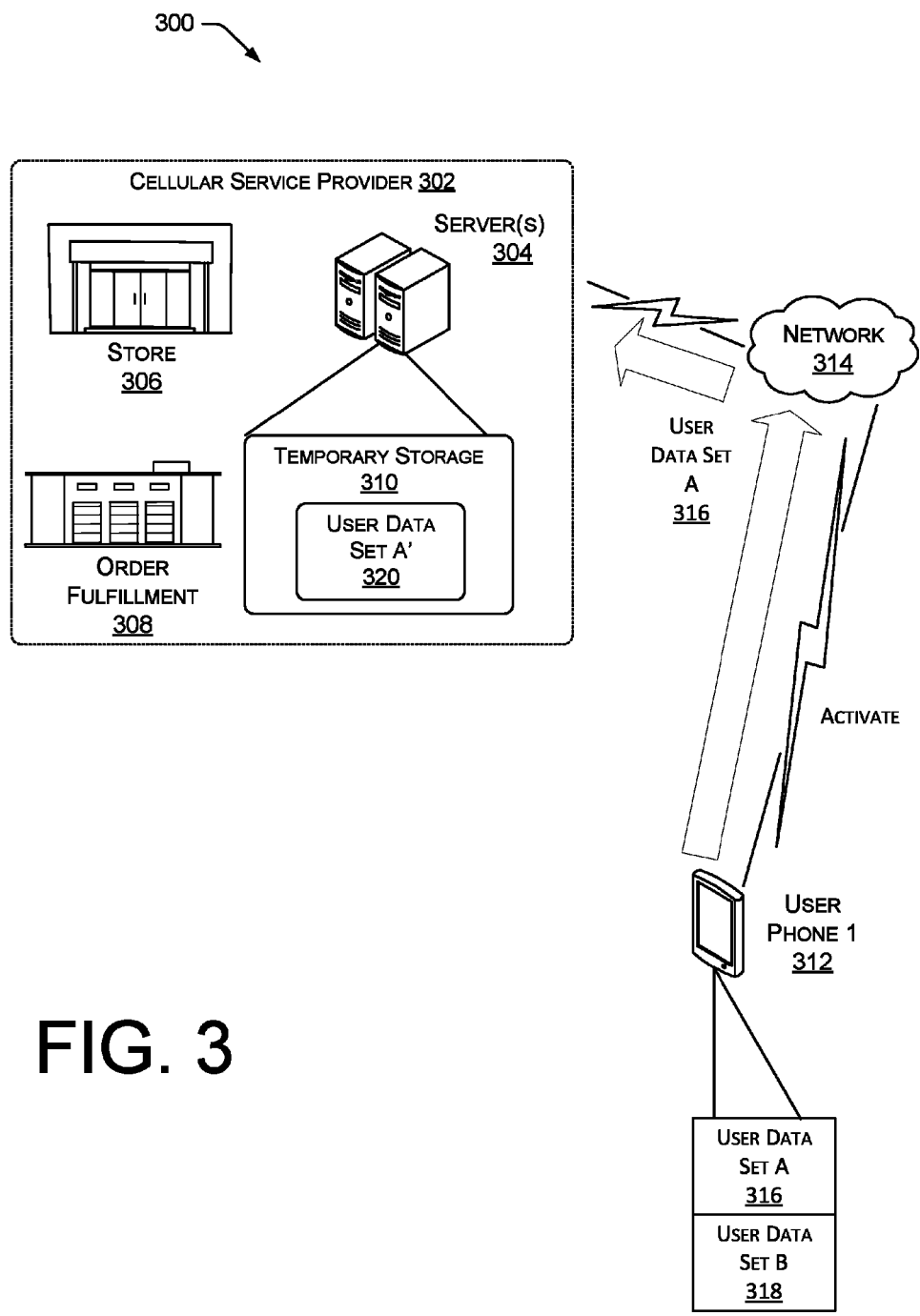
FIG. 3 is a representation of example architecture for implementing intermediate steps of the device switching technology described herein.

FIG. 3 is a representation of an example architecture 300 for implementing subsequent intermediate steps of the device switching techniques described herein. The example architecture 300 includes a cellular service provider 302 having one or more servers 304, a retail store 306, and an order fulfillment center 308. The servers 304 include temporary storage 310 set up as previously described.

The cellular service provider 302 communicates with user phone_1 312 over a network 314, such as the Internet or a cellular phone/data service network. User phone_1 312 stores user data set A 316 and user data set B 318. The user, via user phone_1 312 activates the link or executes a data transfer application as shown and described in relation to FIG. 2. The data transfer process causes at least a portion of the user data—user data set A 316 in this example—to be uploaded to the cellular service provider 302 and stored in the temporary storage 310 in the servers 304. The transferred data is shown as user data set A' 320. Note that at least a portion of user data—user data set B 318 in this example—is not transferred to the cellular service provider 302 but remains on user phone_1 312.

As previously stated, the user can initiate this data transfer process at the user's convenience. Because the data transfer will typically take approximately half an hour, the user can do this when the user is busy with other tasks that do not require user of user phone_1 312. In this way, the user will save time when finalizing data transfer to switch to a new phone. Furthermore, this process can take place at any time, including during off-peak hours, which saves network bandwidth during peak usage hours.

Figure 4:
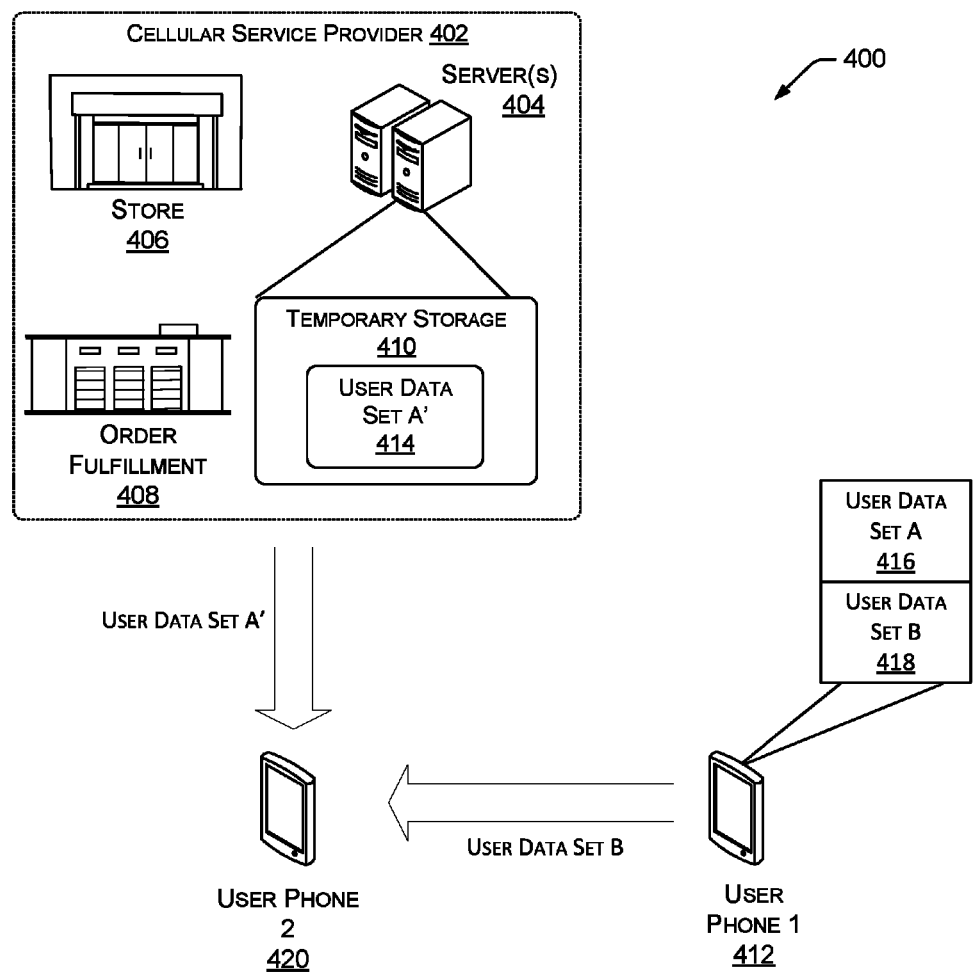
FIG. 4 is a representation of an example architecture for implementing intermediate steps of the device switching technology described herein.

FIG. 4 is a representation of an example architecture 400 for implementing subsequent intermediate steps of the device switching technology described herein. The architecture 400 shown in FIG. 4 depicts subsequent states of entities and data shown in previous figures.

The example architecture 400 includes a cellular service provider 402 having one or more servers 404, a retail store 406, and an order fulfillment center 408. The servers 404 include temporary storage 410 dedicated to data from user phone_1 412, indicated as user data set A' 414. User data from user phone_1 412 includes at least two parts: user data set A 416 and user data set B 418. User data set A' 414 is a copy of user data set A 416.

This representation depicts steps that occur when a user receives a new phone (user phone_2 420), has uploaded a portion of user data (user data set A' 414) to the temporary storage 410, and is able to have user phone_1 412 and user phone_2 420 in close proximity Although described as having user phone_1 412 and user phone_2 420 in close proximity, such an arrangement is not necessarily required.

As will be readily apparent after further description, subsequent steps to transfer remaining user data from user phone_1 412 to user phone_2 420 can be accomplished when the phones are not in close proximity to one another. In other words, the following steps can be accomplished remotely over a network (not shown).

Typically, the user will receive the new phone (user phone_2 420) by going to the retail store 406 and meeting with an agent of the cellular service provider 402. At that time, usually with the agent's assistance, user data set B 418 is transferred to user phone_2 420 to complete the transfer of personal user data from user phone_1 412 to user phone_2 420. Such a transfer can be completed in any way known in the art, such as via a direct wired or wireless (e.g. Bluetooth, etc.) connection, over a private or public network.

Figure 5:
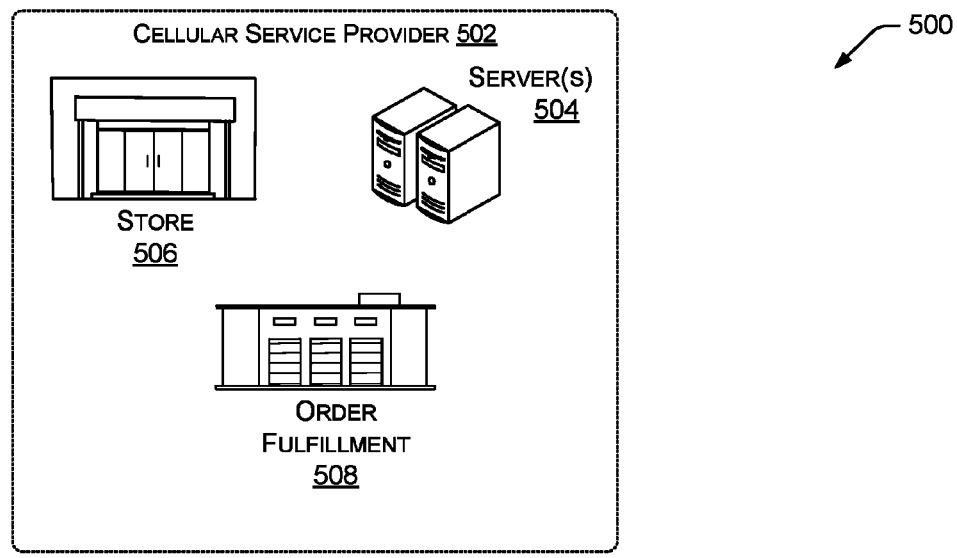
FIG. 5 is a diagram of an example architecture for implementing final steps of the device switching technology described herein.
Figure 5:
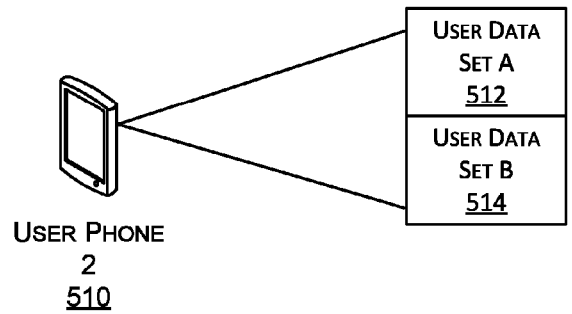

FIG. 5 is a diagram of an example architecture 500 for implementing final steps of the device switching technology described herein. The architecture 500 indicates final states of previously described entities after the data transfer has been completed.

The architecture 500 includes a cellular service provider 502 that includes one or more servers 504, a retail store 508 and an order fulfillment center 510. At this point—after the data transfer is complete—the user's new phone (user phone_2 510) includes copies all of the user data (user data set A' 512 and user data set B' 514) that was stored on the original phone (not shown). Also, the cellular service provider 502 deletes the temporary storage (not shown) previously set up and dedicated to the user. This deletion also deletes all personal data that was stored in the temporary storage.

The deletion of the temporary storage can be accomplished in more than one way. One way is that the data transfer process is set up to automatically delete the temporary storage space and data upon completion of the data transfer process. Another way is that the temporary storage can be set up with an expiration date, for example, fourteen (14) days after the temporary storage was set up and the user was notified to back up user data. Or it can be deleted upon a manual command from an agent of the cellular service provider 502 upon confirmation that the data transfer process completed successfully.

Example Methodological Implementation

Figure 6:
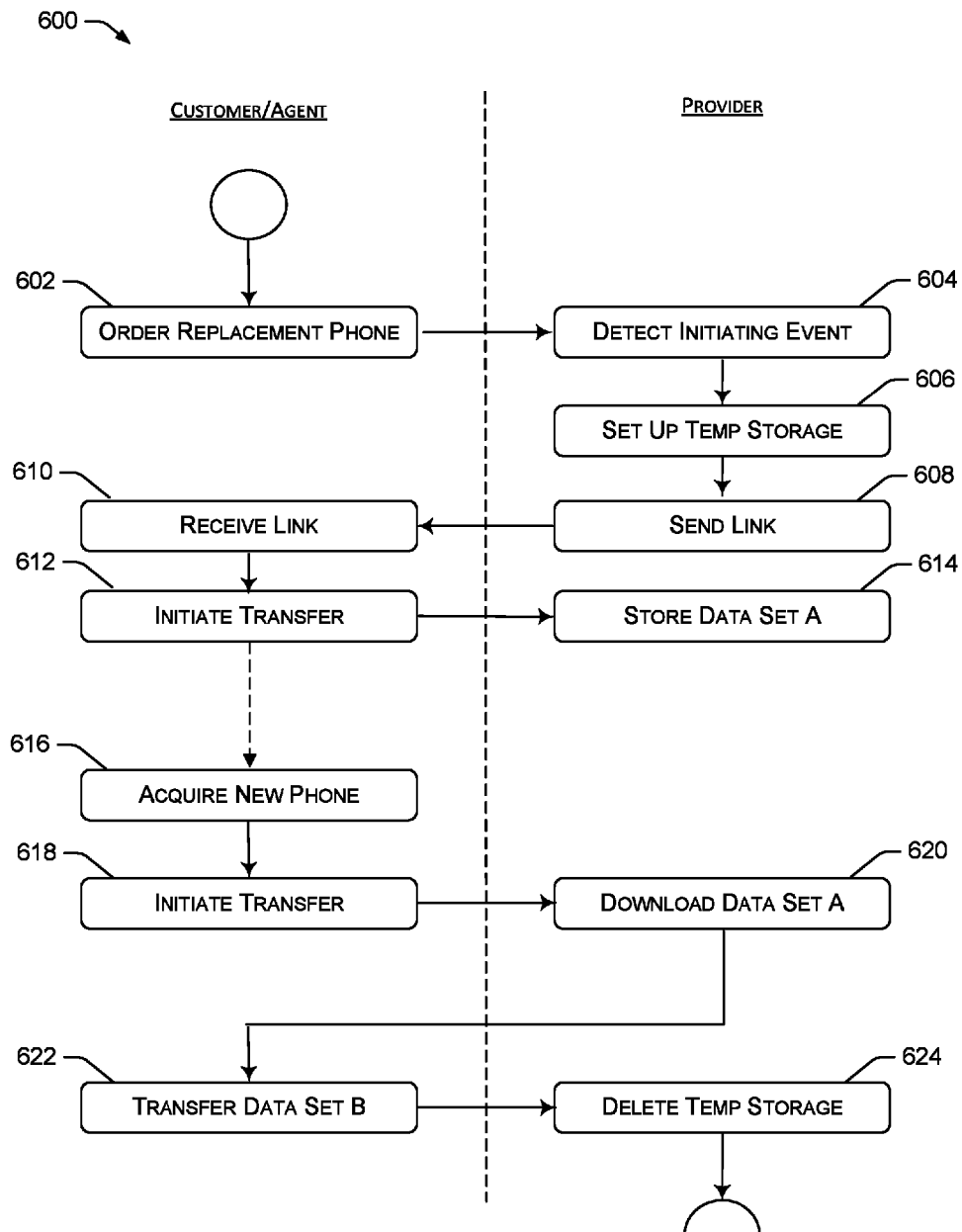
FIG. 6 is an example flow diagram of at least one implementation of the device switching technology described herein.

FIG. 6 is a flow diagram 600 of an example methodological implementation for the device switching service technology described herein. As shown, the steps of one particular implementation are shown divided between the entity that accomplishes each step. In this instance, the tasks (i.e. steps) are divided between the customer (or agent) and the cellular service provider. However, it is noted that at least some tasks may be performed by an entity other than the one shown, or by a combination of entities.

At block 602, an initiating event is detected, such as an event indicating that a user has ordered a replacement phone. It is noted that this event may be a different event and it may be initiated by an agent of the cellular service provider. For example, if a customer service agent working with a customer regarding a functional problem with the user's phone, the customer service agent can be enabled to initiate the process described herein.

At block 604, the cellular service provider detects the initiating event and sets up temporary cloud storage at block 606. The term "cloud storage" merely means that the storage is remote from the user and accessible by the user via a communication network.

At block 608, the cellular service provider sends a link to the user. The link, when activated by the user, starts a data transfer process to transfer at least a portion of user data from the user's phone to the temporary cloud storage. This can be accomplished in other ways, such as by sending a message to the user requesting that the user initiate a backup application from the user's phone, or by some other method known in the art.

The user receives the link at block 610 and initiates the data transfer application at block 612, whereupon at least a portion of user data ("user data set A") is uploaded from the user's phone to the temporary cloud storage (block 614). Such initiation can be done at the user's convenience, from any user location where the user can connect a user phone to a cellular service provider system over a communication network.

At a later time, the user acquires a new phone (block 616), either by a delivery service or in person at a retail location of the service provider. A data transfer process is initiated at block 618 to download the portion of data (user data set A) from the temporary storage to the user's new phone at block 620. After this is accomplished, and when the user (or a provider agent) has access to both phones, the remaining user data (user data set B) from the user's original phone is transferred to the user's new phone (block 622) and all of the original user data is now stored on the user's new phone. At this point, the temporary storage is deleted at block 624 and the process is complete.

Systems and method for a device switching services have been described, in general and specific terms, that provide a way for customers and providers to save time over currently known technologies. In addition to saving time, network bandwidth is used more efficiently. Use of such systems and methods allow a provider to serve customers better and deliver a more pleasant experience to customers when they need to switch from one cell phone to another.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    detecting an event that indicates data from a first electronic user device is to be transferred to a second electronic user device;
    allocating temporary memory storage to store user data from the first electronic user device;
    providing a mechanism to initiate a data transfer of at least a first portion of user data from the first electronic user device to the temporary memory storage;
    receiving the at least a first portion of user data from the first electronic user device and storing said first portion of user data in the temporary memory storage;
    transferring the at least a first portion of user data from the temporary memory storage to the second electronic user device;
    facilitating transfer of a second portion of user data from the first electronic user device to the second user device, said transfer occurring at a time after the transfer of the first portion of user data; and
    deleting the temporary memory storage and the data stored therein.

2. The method as recited in claim 1, wherein access to the data stored in the temporary memory storage is allowed only to the first electronic user device and to the second electronic user device.

3. The method as recited in claim 2, wherein the receiving the first portion of user data is carried out over a first mode of communication, and wherein the transferring of the first portion of user data is carried out over a second mode of communication.

4. The method as recited in claim 1, wherein the detecting an event that indicates data from a first electronic user device is to be transferred to a second electronic user device further comprises detecting a placement of an order for the second electronic device.

5. The method as recited in claim 1, wherein the event that indicates a user will need to transfer data from a first electronic user device to a second electronic user device is a signal from an entity other than the user that indicates the user will need to transfer data from the first electronic user device to the second electronic user device.

6. The method as recited in claim 1, wherein the providing further comprises providing a link to a data transfer application to the user which, when activated, causes the first portion of the user data to be transferred from the first electronic user device to the temporary memory storage.

7. The method as recited in claim 6, wherein the providing further comprises communicating with the user that the user should cause the user data to be transferred from the first electronic user device to the temporary memory storage.

8. A method for transferring user data from a first cellular telephone to a second cellular telephone, the method comprising:
   receiving an indication that a user of the first cellular telephone will be switching to use the second cellular telephone;
   establishing memory storage to be used in a process to transfer data from the first cellular telephone to the second cellular telephone;
   providing the user with means for the user to transfer at least a first portion of the user data to the memory storage;
   receiving at least the first portion of the user data and storing said data in the memory storage;
   receiving an indication to transfer the first portion of the user data from the memory storage to the second cellular telephone;
   transferring the first portion of the user data from the memory storage to the second cellular telephone;
   facilitating transfer of a second portion of the user data from the first cellular telephone to the second cellular telephone, said transfer occurring at a time after the transfer of the first portion of user data; and
   deleting the memory storage used in the transfer process and the user data stored therein.

9. The method as recited in claim 8, wherein establishing memory storage further comprises establishing private memory storage that can only be accessed via the first cellular telephone and the second cellular telephone.

10. The method as recited in claim 8, wherein the indication that a user of the first cellular telephone will be switching to use the second cellular telephone is an order for the second cellular telephone.

11. The method as recited in claim 8, wherein the indication that a user of the first cellular telephone will be switching to use the second cellular telephone is a signal from a customer agent to send the second cellular telephone to the user.

12. The method as recited in claim 8, wherein the establishing memory storage further comprises establishing an expiration time at which the memory storage and any contents therein will be automatically deleted.

13. The method as recited in claim 8, wherein the providing the user with means for the user to transfer at least a first portion of the user data to the memory storage further comprises transmitting a link to a data transfer application to the user that, when activated, causes the at least first portion of the user data to be transferred to the memory storage.

14. The method as recited in claim 8, wherein the providing the user with means for the user to transfer at least a first portion of the user data to the memory storage further comprises transmitting a notification to the user providing instructions for carrying out the data transfer of the at least first portion of the user data.

15. The method as recited in claim 8, wherein the receiving of the first portion of the user data is carried out via a first modality, and the transferring of the first portion of the user data is carried out via a second modality.

16. One or more computer-readable storage media comprising computer-executable instructions that, when executed by a computer, perform the following steps:
   detecting a switching event wherein user data from a first electronic device will be transferred to a second electronic device;
   setting up temporary storage dedicated to a user of the first electronic device;
   providing a mechanism for the user to back up a first portion of the user data to the temporary storage;
   storing the first portion of the user data in the temporary storage;
   transferring the first portion of the user data from the temporary storage to the second electronic device;
   removing the temporary storage, including deleting the first portion of the user data stored in the temporary storage; and
   facilitating transfer of a second portion of the user data directly from the first electronic device to the second electronic device, said transfer occurring at a time after the transfer of the first portion of user data.

17. The one or more computer-readable storage media as recited in claim 16, wherein data stored in the temporary storage is only accessible by the user.

18. The one or more computer-readable storage media as recited in claim 16, wherein the mechanism provided for the user to back up a first portion of the user data is a first mode of communication connection, and the transferring of the first portion of the user data is accomplished by using a second mode of communication connection.

19. The one or more computer-readable storage media as recited in claim 16, wherein the switching event is receipt of an order by the user for the second electronic device.

20. The one or more computer-readable storage media as recited in claim 16, wherein the switching event is a signal from a provider of the second electronic device to initiate the data transfer process.

* * * * *